Nov. 25, 1930.     R. H. TALBUTT ET AL     1,782,946
ROASTING APPARATUS
Filed April 18, 1929     6 Sheets-Sheet 6

Patented Nov. 25, 1930

1,782,946

UNITED STATES PATENT OFFICE

ROBERT H. TALBUTT, DECEASED, LATE OF BALTIMORE, MARYLAND, BY RALPH ROBINSON, ADMINISTRATOR, AND FREDERICK A. ALLNER, OF BALTIMORE, MARYLAND

ROASTING APPARATUS

Application filed April 18, 1929. Serial No. 356,071.

This invention relates to improvements in heating apparatus and particularly to roasters of that type wherein a rotary container or roasting cylinder constituting the roasting chamber is located within an outer shell or frame. More especially, the invention relates to apparatus for roasting such material as coffee beans, but it will be appreciated that the invention is also applicable for the roasting of other commodities, or materials, such as cocoa, cereals, peanuts, and ores, etc.

As has been stated, the invention is especially designed for the roasting of coffee beans, and while various types of such apparatus have heretofore been devised it seems that they are each open to one or more objections. In those roasting machines, deriving their heat from combustion of the gaseous fuel, the roasting takes place in the chamber or roasting cylinder in the presence of actual combustion. Such an arrangement does not produce as perfect a roast as is desired for various reasons. First, all gaseous fuels contain certain impurities, for example, compounds of sulfur, and due to the highly absorbent properties of the roasting product, such impurities have a highly contaminating effect on the aroma and flavor that is so desirable in roasting materials of high quality, such as coffee. It is well known that materials such as coffee have quite an affinity for absorbing odors, so much so, that even in the shipment of green coffee considerable care is taken to keep the coffee away from strong smelling materials such as sheep skins, oil, etc., as the odors of these latter materials, once absorbed by the coffee bean, can rarely be disassociated from it by subsequent treatment. This property of absorbing odor is augmented when the coffee bean is heated and its natural moisture content driven off while being roasted. Thus, even an infinitesimal amount of odor bearing impurities imparted during the roasting operation may be sufficient to impair full development of natural aroma and pleasing flavor in the finished product.

Another imperfection of gas roasting is due to the fact that a large part of the fuel gas is reduced to steam during the process of combustion and the rate of dissolution of all aromatic substances in the coffee is greatly increased by the presence of steam. Consequently, with a delicate flavored material, such as coffee, a large percentage of its aromatic substances will be given up or lost. Another feature of the gas roasting process, as ordinarily employed, is that the gas-fired roasting machines require a large amount of excess air which causes further evaporation of those essential oils that are aroma carriers and also volatilization of fats and other substances forming the body of the roasted product. The excess air or air in excess of that required for complete combustion of the gaseous fuel is necessary in gas roasters in order to quickly reduce the flame temperature to a point where the roasted product surrounding the combustion zone is not damaged by burning and to quickly remove the burning gases and smoke, together with the chaff. This condition not only detracts from the development of full aroma and flavor but also results in a uniformly high shrinkage. Further, the heat transfer from the gaseous fuel to the product being roasted, is accomplished for the most part by convection and very little by radiation and conduction. Heat transfer by convection is essentially a surface action. The mixture of burned gases and air strikes the surface of the small bodies of material and the heat is transferred to the surface molecules which, in turn, transmit the heat to the molecules of the inner part of the material, and as a substantial difference in temperature between the inner and outer layer of the particles is required in order to make the heat travel from the exterior to the interior on account of the fact that the material is not a good conductor of heat, it has been found that heat transferred by convection only has a tendency to over-roast the surface by the time the interior has been roasted to the proper degree.

On the other hand, it has been found that bodies, such as coffee, cereals, and other non-metallic bodies, while impervious to light rays, are diathermanous or transparent to heat rays emitted from a radiant source so that such rays, in the roasting of coffee and the like, penetrate the surface of the material and give up only a portion of their heat units to the outer layers of such bodies of material. This explains why a product roasted by radiated heat is roasted more evenly and uniformly as compared with a product roasted by convection.

In view of the foregoing observations, the primary object of the present invention is to provide a roasting apparatus wherein heat is derived from an electrical unit and the materials roasted by heat transferred from such electrical units, the maximum amount of heat transfer being obtained by radiation, a lesser amount by conduction and a minimum amount by convection as distinguished from securing the roast by a minimum heat transfer by radiation and conduction. Another object is to control the transfer of heat by radiation, conduction and convection by providing means in proximity to the electrical heating unit which will absorb a certain amount by heat radiation and transmit it by conduction to the material being roasted. The apparatus utilized for illustrating the present invention is particularly adapted for the roasting of coffee and in accomplishing the last stated object, a baffle is mounted over the electrical heating unit, the coffee in the roasting chamber falling on said baffle whereby it receives a certain amount of heat by conduction. This baffle is made of double walls separated from one another or insulated from one another by air or other insulating material and by varying the spacing of the two walls the temperaure of the baffle, as well as the heat transmitted by it to the coffee beans, may be controlled so as to maintain it at a point below that temperature which would burn or spot the coffee beans coming in contact therewith.

A further object of the invention is to maintain the heat transmitted by radiation at a maximum, this being accomplished by arranging the electrical heating elements under the above mentioned baffle so that the maximum surface thereof is exposed to the coffee beans which are kept constantly moving beneath said elements and by operating the electrical heating elements at the highest practical temperature permissible without causing deterioration when operated continuously.

In addition to the heat transmitted by conduction, from the baffle to the coffee beans, and the heat transmitted by radiation, additional heat is transferred by convection, the air which is used for moisture and chaff removal being also utilized in this transfer of heat by convection. This might properly be termed forced convection in the present structure. Another object relates to the means which are employed for controlling the amount of heat transmitted by this forced convection. This is accomplished by interposing between the electrical heating elements in close proximity thereto, one or more metallic grids which absorb radiant heat from adjacent elements and which are designed to have a maximum surface per unit volume to facilitate convection. Due to the close proximity of the grids to the electrical elements their heat absorption by radiation is relatively high so that the temperature of the grids approaches that of the electrical elements and on account of the large surface exposed to the forced air flowing therethrough, the heat absorbed by the air is sufficient to keep the temperature of the electrical elements within safe operating limits.

A still further object of the present invention relates to the system of chaff removal wherein the amount of air required is approximately the same as that required by moisture removal.

A still further object relates to the system of air preheating from which air entering the roaster from the exterior for removing the moisture and chaff from the interior of the roaster takes up a considerable part of the waste heat from the heated mixture of air and moisture being exhausted from the roaster. To further increase this preheating of air entering the roaster with heat otherwise wasted, such air is also brought into contact with the frame portion of the roaster which supports the terminal. This results in a substantial increase of thermal efficiency of the apparatus and in addition renders it unnessary to provide special construction for insulating the outside shell and end frame of the apparatus.

With these and other objects in view, the present invention consists of certain novel details of construction and combinations and arrangements of parts, all as will be hereinafter more fully described and the novel features thereof particularly pointed out in the appended claims.

In the accompanying drawings,

Fig. 1ª is a detail view of the exhaust flue and the damper therefor;

As before mentioned, the present invention is illustrated herein in connection with coffee roasting apparatus comprising rigid end frames, which, for convenience, are made in two parts, the lower sections 1, 2, extending from the floor to substantially the center line of the roasting cylinder, and the upper sections 1ª, 2ª, secured to the lower sections by bolts 3. These end frames constitute the ends of the roaster and if desired may be held in properly spaced relation by suitable means, but it is preferred that they be held by the circular casing 4 which extends from one end of the frame to the other and is rigidly secured to both of said frames. Within the exterior casing 4 and spaced therefrom by an air chamber 5 is an intermediate casing 6 and spaced inwardly from said intermediate casing 6 is an inner casing 6ª and passageway 7 between said intermediate casing 6 and the inner casing 6ª terminating at the outlet pipe 8 through which the chaff and moisture is removed from the interior of the roaster as will be hereinafter described. Casings 6, 6ª, are rigidly secured to the inner casing support 17 mounted on end frame sections 1, 1ª, while the opposite ends of casings 6, 6ª are supported by casing support 18 rigidly mounted on end frame sections 2, 2ª, but said casings 6, 6ª, are secured to support 18 by means of fastenings which permit expansion of the casings when they become hotter than outer casing 4. For convenience, casing 4 may be open at point 10 at the top and 10ª at one side so that each side may be lowered on hinges 11 and casings 6, 6ª and supports 17, 18 are split at substantially the horizontal central line of the roasting cylinder and the sections thereof hinged as at 9 to permit the upper half of said casings to be lifted free of the roasting cylinder so as to facilitate inspection and cleaning.

Within the inner casing 6ª there is a roasting drum in the form of a perforated cylinder 12 whose ends are closed by heads 13, 14, formed with hollow trunnions 15, 16, projecting outwardly into engagement with the peripheries of trunnion wheels journaled in suitable pockets in the end frames 1, 2. To permit longitudinal expansion of drum or cylinder 12 the trunnion at one end of the cylinder, preferably the front, has a circumferential groove in which the trunnion wheels are received while the trunnion 16 at the rear has a plain periphery adapted to engage the trunnion rollers so that the cylinder may expand when hot. Furthermore, both sets of trunnion wheels are adjustable radially from the exterior of the roaster so as to insure proper support of the drum. A convenient arrangement for rendering the journals adjustable is to secure said rollers on a shaft having enlarged bearing surfaces for the rollers eccentric to the reduced ends journaled in the frame so that by rotating the shafts the center of rotation of the rollers may be moved toward or from the center of the rotating cylinder. The drum is adapted to roll upon these trunnion wheels, being rotated by power applied to shaft 22 journaled in a bushing 23 in the rear frame and projecting into frame 2, its inner end being provided with pinion 24 meshing with a ring gear 25 on the drum head 14. The drive shaft 22 is preferably driven by means of the worm reduction gear mounted on a bed plate 27 with the driving motor 28 which is directly connected to said reduction gear by means of a suitable coupling device 20. The trunnion wheels are lubricated by lubricant from oil cups 29. The particular manner in which the drum is mounted on the trunnion wheels, the adjustability of said rollers, and the driving mechanism for the cylinder, forms no part of the present invention, being more fully described and shown in Patent No. 1,585,437, granted to Robert H. Talbutt, May 18, 1926.

The rotating drum and the exterior frame are formed with an opening at one end for charging the cylinder with coffee to be roasted and discharging it after it has been roasted. This opening has a closure formed by a flanged thimble 30 fastened to the frame sections 1, 1ª, by screws 31, said thimble extending inwardly of the casing to a point in line with the inner face of drum head 13. Suitable clearance between trunnion 15 and thimble 30 is provided at 32 at which point there is formed a series of circumferential grooves 32ª on the interior of trunnion 15 and on the exterior of thimble 30 to minimize the leakage of air and chaff through said clearance. Thimble 30 is provided with an outwardly directed chute 33 adjacent a rectangular opening in said thimble, said opening being provided with a door 34 which has an outwardly extending side 35 on which is mounted a combination latch and handle 36. Door 34 is shown in dotted lines 34ª in charging operation and in dotted lines 34ᵇ for discharging. The interior of the rotating cylinder is provided with helical vanes 38, 39, so arranged that as the drum rotates, the coffee is continuously agitated and evenly distributed in the drum. At one end of the cylinder said vanes terminate in inclined chute 40 for facilitating discharge of the coffee when door 34 is in the position indicated in dotted lines at 34ᵇ. A small rectangular aperture is also formed in front thimble 30 in which a sample scoop 41 may be placed so as to project into the drum or cylinder whereby a sample of the coffee in the interior of the cylinder may be extracted, said aperture being closed by a sliding cover 42 adapted to be closed by gravity when the scoop is removed.

At the opposite or rear end of the roaster a flanged thimble 43 is secured by screws 44 to the rear sections 2, 2ª, said thimble extending inwardly to a point in line with the inside face of drum head 14 and suitable clearance being provided between said thimble and trunnions 16 as at 21, at which point circumferential grooves 21ª are provided similar to the front end of the apparatus. Rigidly secured by bolts 45 to the inner face of rear thimble 43 is a hood or baffle 46 extending longitudinally of the drum and supported from the front thimble by a horizontal supporting bar 47 projecting through a hole in said thimble, said bar 47 being loose in said thimble 43 so as to allow for expansion of the hood when heated. To prevent heat transfer into the thimble, a suitable heat insulating liner may be interposed between said thimble and baffle, preferably of asbestos. This hood or baffle 46 is of double construction, comprising an inner baffle wall 48, the inner and outer walls 46, 48, being insulated from one another as by the air space 49 between them or by some solid insulating material interposed in said space 49. The electrical heating elements 50 are arranged in a supporting structure consisting of insulators 51 mounted on channel irons 52 supported in angle irons 54 mounted on upright supports 53 and bars 55 which serve as sliding members on the cross bars 56 which are supported from the baffle 46. A flanged cover plate 57, to which are fastened angle irons 54 and bars 55, serves to cover an opening in the rear thimble 43 through which the heating elements may be inserted in the roasting cylinder. That is, the heating elements 50 are supported on angle irons 54 and bars 55 which are in turn supported from the cover plate 57, said angle irons and bars simply sliding on cross bars 56 when the heating elements are inserted in or removed from the roasting chamber. Cover plate 57 is secured in place by bolts 58 and is also provided with porcelain insulating bushings 59 through which suitable terminal rods 60 project to connect the heating elements to power supply cable connectors 61 and cable 62. A narrow vertical slot 63, covered with mica is formed in cover plate 57 to permit visual inspection of the heating elements when desired. Preferably, the electric heating unit is comprised of three elements, as shown, which may be designated 50ª, 50ᵇ, and 50ᶜ. Each one of these elements is a continuous strip of suitable material supported in grooves 51ª in the insulators 51 and each of the ribbons or elements 50ª and 50ᵇ are connected to element 50ᶜ. It will be observed that practically all of the area of the elements is exposed so far as insulators 51 are concerned, so that any coffee in the lower portion of the roasting cylinder is exposed to a maximum portion of the area of said heating elements so as to be heated and roasted by radiation. Bearing in mind that the coffee is being constantly agitated by roasting cylinder 12 it will also be understood that a portion of the coffee is constantly elevated by the helical vanes 38, 39, to the upper portion of the chamber at which point it will fall on the outer wall 46 of the baffle above the heating unit. In this way, the coffee is roasted to some extent, by conduction, but due to the double walled effect of said baffle, which permits the temperature of the outer wall of said baffle to be rather accurately regulated, there is no danger whatever of the coffee beans being burnt or spotted by an excessive heating of said baffle. In fact, as before mentioned, the major portion of the roasting effect is accomplished by heat radiation, or, in other words, the major portion of the roasting operation, is performed at that time during which the coffee beans are in motion beneath the heating unit or elements. In addition to this roasting by radiation and conduction, such roasting is also partially performed by convection. In the present instance, this roasting by convection, might properly be termed roasting by forced convection because, in accordance with the present invention, there is imposed between the heating elements means for augmenting the heating of air flowing past said heating elements. Preferably such means for accomplishing this forced heating of the air consists of a metallic grid formed of closely spaced metallic elements 72 so formed and relatively spaced to one another that they provide a long tortuous path for the air passing therethrough and offer resistance to the flow of the same so as to obtain a uniform distribution thereof over the entire area of these metallic elements 72, which, for convenience, will be herein designated as the grid. Preferably, said grid is interposed between said heating elements 50ᵇ and 50ᶜ and is supported on the supporting structure of said heating elements so as to be movable therewith as a unit or, in other words, the grid and heating elements may be inserted in or removed from the roasting chamber as an entity. The principal function of said grid 72 is to aid in the transfer of heat from the heating elements by means of radiation and forced convection. The close proximity of the grid to the high heating elements naturally results in a higher rate of heat transfer to the grid by radiation and because of the long tortuous path offered by said grid to currents of air flowing therethrough, said grid has a large surface exposure to said air and there is a consequent higher rate of heat transfer or exchange by convection. In order to obtain the full benefit of the transfer of heat from the grid to the air entering the roasting chamber, it is proposed that all air entering said chamber shall do so at a point beneath the hood 46 and, by having the grid occupy substantially the entire area between the middle and bottom heating elements 50$^b$, 50$^c$, practically all air entering the roasting chamber proper must necessarily pass through the grid. In view of this, the air inlet or air inlet passage in the present apparatus comprises a covering or hood 68 enclosing the rear end of the apparatus but open at its lower end 69. A baffle 70 within said hood 68 serves to direct the incoming air over the terminals 60, 61, thus maintaining these terminals comparatively cool and recovering heat which would otherwise be wasted. From hood 68 the incoming air passes through a segmental opening 67 in rear frame section 2$^a$ into chamber 5 between outer casing 4 and intermediate casing 6. From this chamber 5 the air, after passing around the casing, flows through a segmental slot 65 in rear frame 2$^a$ into a manifold 64 provided with an outlet 66 from which the air escapes or flows into the roasting chamber beneath the baffle 46. In this way, all of the air necessary in the roasting operation is supplied to the interior of the roasting chamber, that is, all the air that is used to remove the chaff and moisture; to effect transmission of heat by convection and to maintain proper temperature by the heating elements. It should be added that the hood 68 has an aperture therein opposite the mica window 63, this aperture being closed by a glass covering 71, which in conjunction with the mica window permits visual inspection of the heating elements during the roasting operation.

Figures 1, 1A:
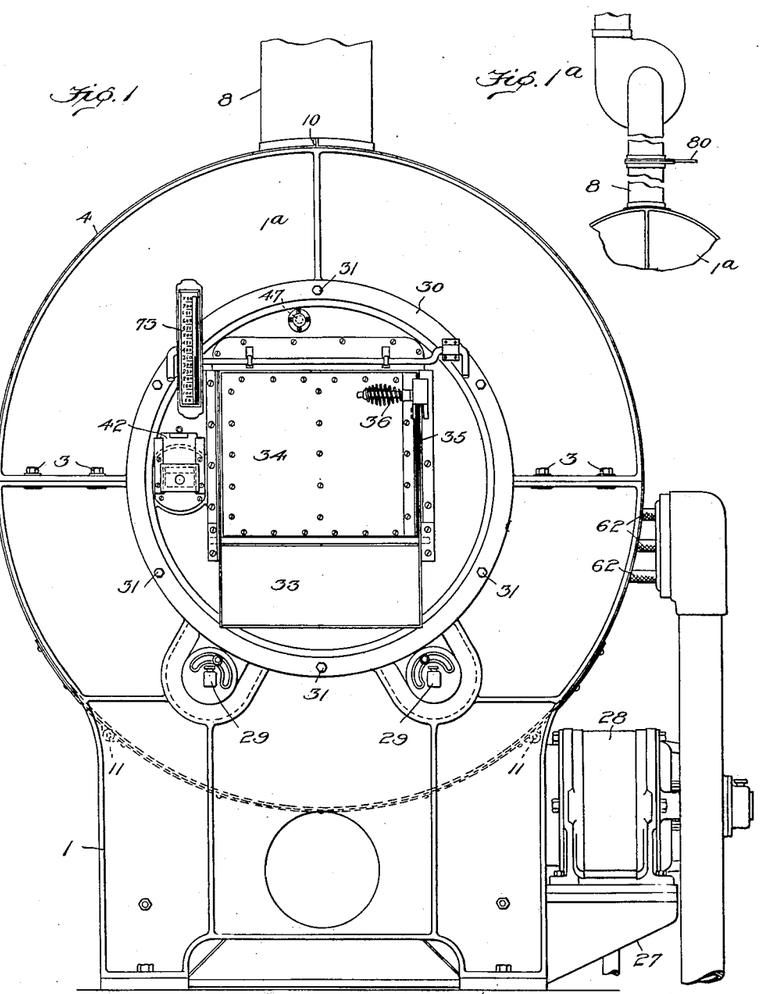
Figure 1 is a front end view of the apparatus embodying the present improvements.
Figure 2:
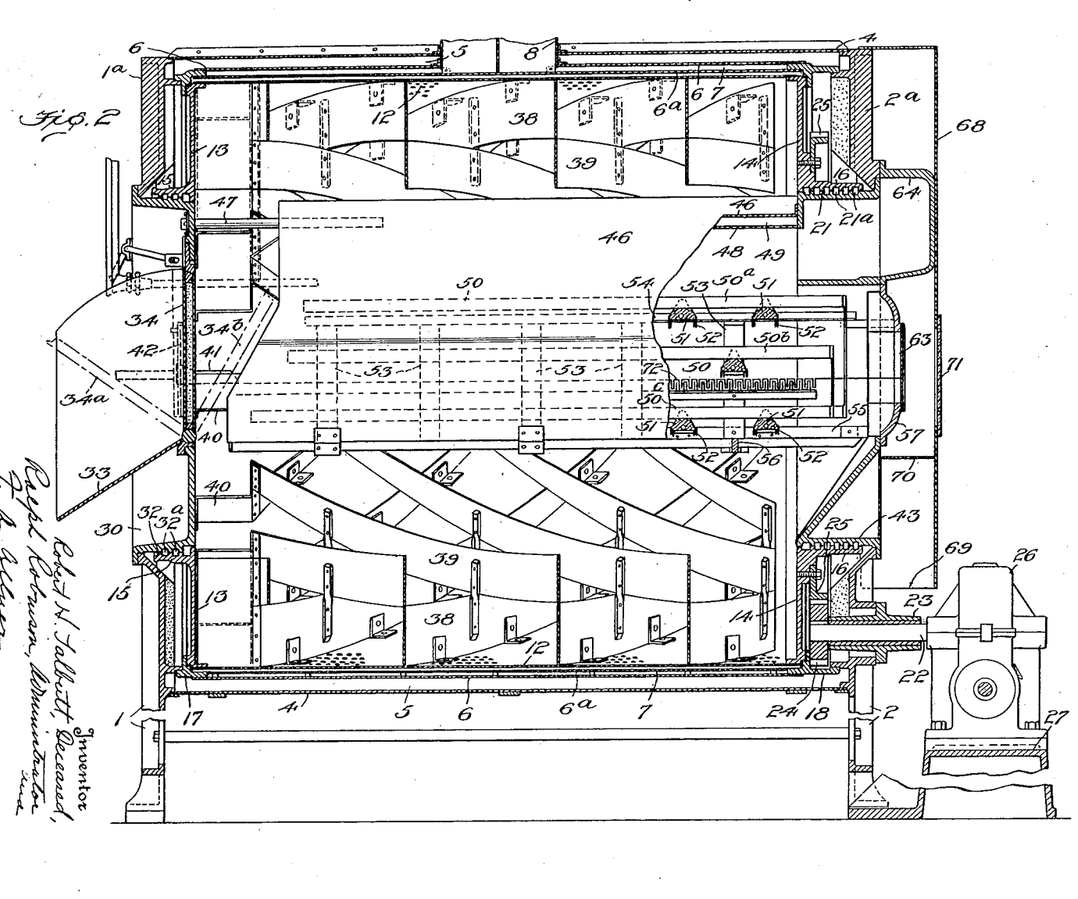
Fig. 2 is a longitudinal section view substantially centrally of the apparatus.
Figure 3:
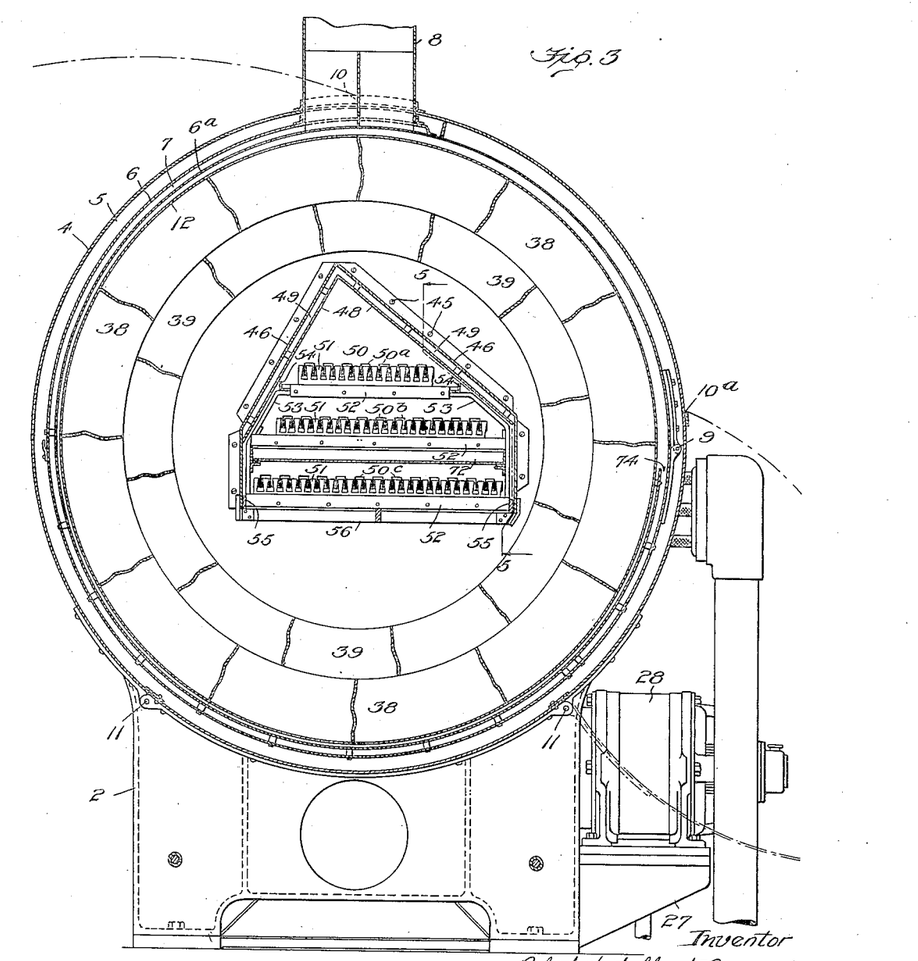
Fig. 3 is a transverse sectional view looking toward the rear of the apparatus.
Figure 4:
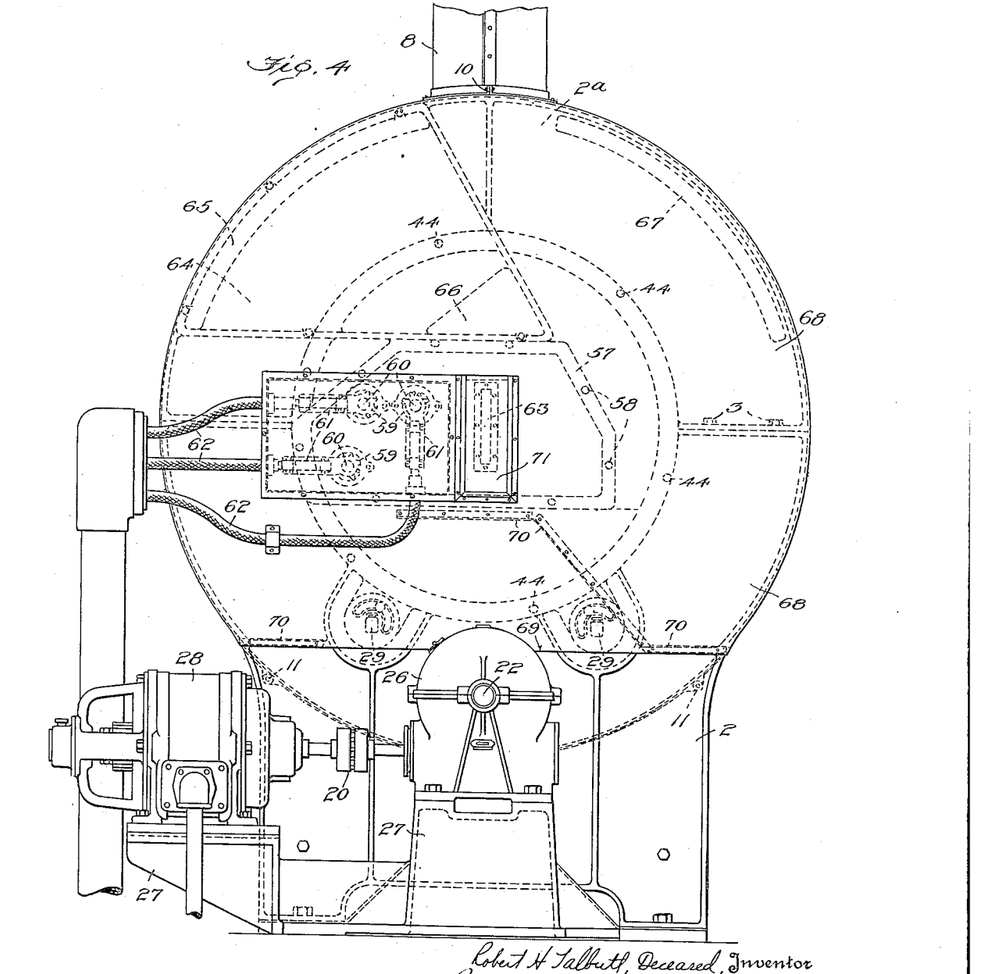
Fig. 4 is a view of the rear end or the end opposite that shown in Fig. 1.
Figure 5:
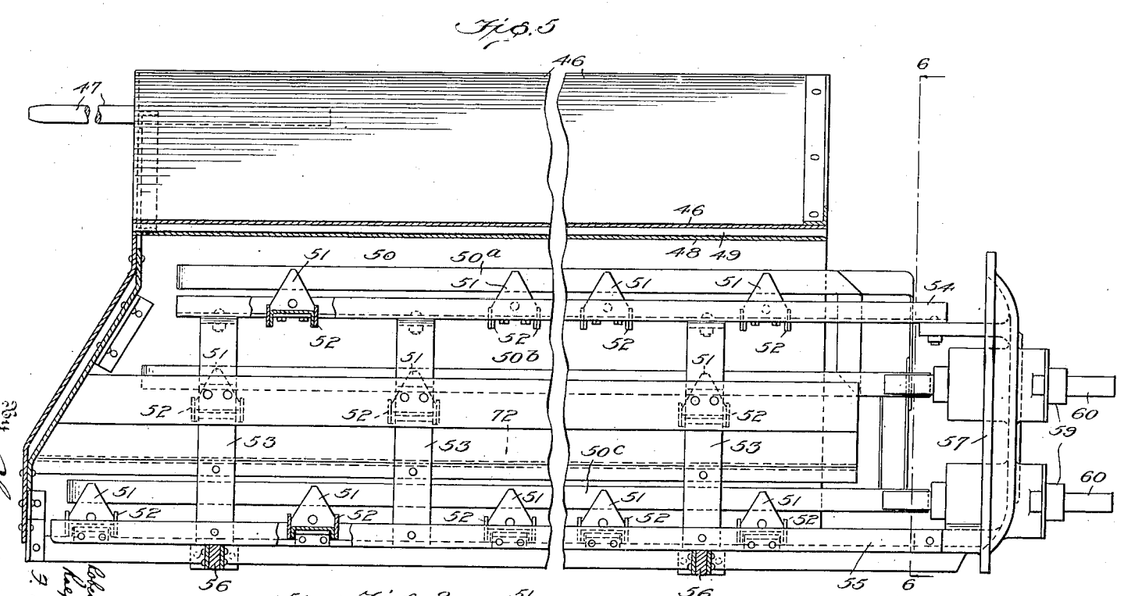
Fig. 5 is a side elevation of the heating unit including the baffle.
Figure 6:
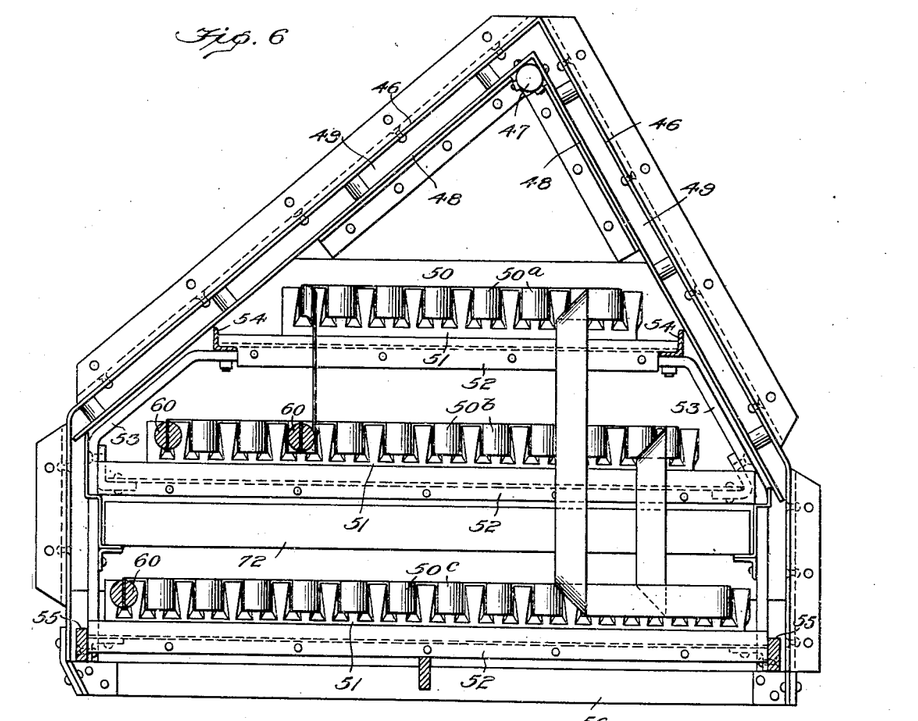
Fig. 6 is a sectional view of the heating unit on the line 6—6 of Fig. 5.
Figure 7:
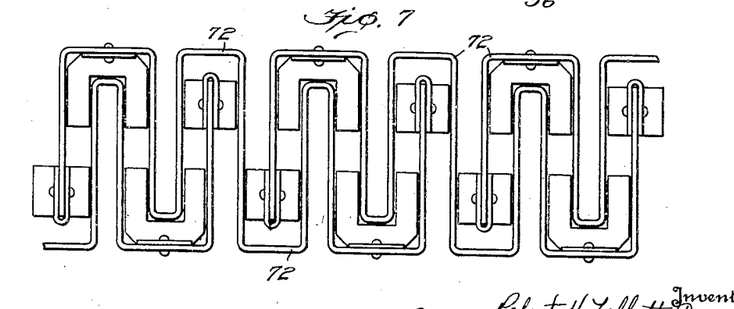
Fig. 7 is a detail view of the grid.
Figure 8:
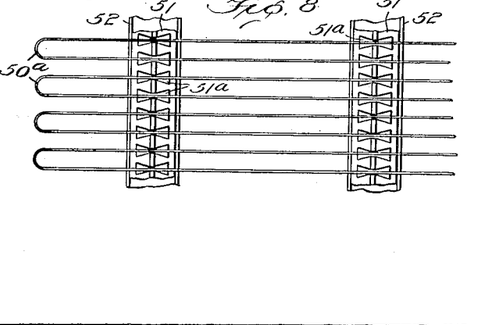
Fig. 8 is a detail view of the electrical resistance material constituting the heating unit proper.
Figure 9:
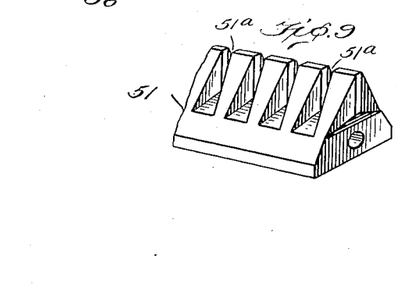
Fig. 9 is a detail view of a portion of one of the supports of insulating material for the electrical resistance element.

For exhausting the air from the roasting chamber, means for drawing the air off by suction is provided in outlet 8, one suction fan being deemed sufficient for this purpose. This outlet 8 communicates with what may be termed the chaff passage or outlet passage 7 formed between the intermediate casing 6 and inner casing 6$^a$ and into which the air enters at the point 74 so that it must traverse the major portion of the periphery of the casings as illustrated in the sectional view of Fig. 3.

In operation, the current is turned on full after the proper amount of coffee has been charged into the drum and the charging door closed. The material within the roasting cylinder 12, naturally rolls, and to a great extent remains at the bottom of the drum, but by the provision of the helical vanes 38, 39, the material is not only thoroughly mixed by being moved back and forward, but it is also carried around and upward to the top of the roasting cylinder where it falls off of the vanes and down and over the inclined sides of baffle 46 which is kept at the proper temperature by the heating elements beneath the same. The progress of the roast may be ascertained from time to time by observing thermometer 73 and withdrawing samples periodically with the scoop 41. The exhaust fan is kept operating continuously, the amount of air being regulated by a suitable damper 80 near the fan. Cold air from the room is drawn into the roaster at the opening 69 from whence it passes over the rear thimble 43 and cover plate 57 as well as the electric terminals, so that the temperature of these parts is held at a minimum. The air then passes to the pre-heating chamber 5 so that it is further heated by the hot exhaust gases flowing in a reverse direction, through passage 7. This employment of the countercurrent principle effects a maximum heat transfer from the exhaust gases to the incoming air. The preheated air is then drawn through manifold 64 to the electric heating units and grid where, by means of convection, it serves to maintain said heating elements at a proper working temperature. The air then coming in direct contact with the coffee and moisture, which is being liberated, aids in heating the coffee and absorbs the moisture in its passage through the agitating material and finally passes through the perforated cylinder 12 together with the chaff and dust, to the entrance 74 of passage 7. The close proximity of casing 6$^a$ to the roasting cylinder 12 is essential in order to produce the desired action to keep the chaff in motion until it reaches entrance 74 to passage 7, from whence the air carries the chaff along and keeps it in suspension by virtue of its high velocity until discharged by the exhaust fan through outlet 8, this high velocity being obtained by reason of the comparatively small cross-sectional area of passage 7 relative to the cross-sectional area of passage 5.

With apparatus constructed as described, it is believed that the high thermal efficiency in the utilization of electrical heat has been secured because of the following new features which have been utilized in the design of the apparatus. For instance, there is present a closed series system of air circulation with leakage reduced to a minimum and in which the same air serves to (1) cool the rear end of the roasting machine; (2) recover heat units otherwise lost by radiation; (3) recover waste heat from the exhaust fans on the counter-current principle; (4) maintain proper temperature of the heating elements; (5) effect heat transfer by convection; (6) remove moisture without condensation; (7) carry both dust and chaff away from the roaster. It is also true that a minimum radiation loss is obtained without the use of heat insulating material by maintaining the outer casing cool with the use of the air inlet 5. It is also necessary to design the chaff removal or exhaust passage 7 so that there will be sufficient velocity to keep the chaff in suspension with the minimum of air required for moisture removal, the actual amount being required being such as to keep the mixture below the dew point so as to prevent condensation. Another important feature is the design of the electric heating apparatus so that it may be operated at a maximum temperature (below that producing deterioration of metal) in order to obtain the maximum practical amount of heat transfer to the coffee, primarily by radiation, secondly, conduction, and a minimum by convection. This condition is effected by the use of the double baffle over the heating elements whereby the outer baffle is kept below the temperature which causes spotting of the beans and the use of the grid so that the temperature of the heating elements may be kept below the maximum safe operating temperature with the minimum amount of air required for moisture removal. Again, by using a smaller amount of air in the removal of moisture than is used in gas-fired roasters, the essential oils in the coffee beans are not evaporated to the same extent and the shrinkage is consequently reduced. Undesirable odors in the products of combustion are also eliminated, resulting in the improvement in the quality of the roast. Further, preheating of the air with the exhaust gases results in the quicker time of roasting, or conversely, for a given time of roasting, the energy required will be less on account of those heat units formerly wasted being regained, so to speak, by preheating. This means smaller sized heating elements and a lower power demand.

What is claimed is:

1. In a roasting apparatus, the combination of an electrical heating unit mounted within a roasting chamber, means for moving the material to be roasted through said chamber, a large area of said unit being directly exposed to the material passing through the chamber to roast the material primarily by radiation, a baffle only partially surrounding said unit for preventing the material contacting with the unit, and means comprising a conduit for supplying heated air directly between said baffle and unit for augmenting roasting of the material by convection.

2. In a roasting apparatus, the combination of an electrical heating unit mounted within a roasting chamber, means for passing material to be roasted through said chamber, a baffle positioned in proximity to said unit but only partially surrounding the same for roasting the material by conduction and for preventing contact of the material with said unit, and means for supplying heated air beneath said baffle for heating the material by convection, the material being also directly exposed to the major portion of the area of the heating unit whereby it is heated by heat waves radiating from said unit, such radiation being the primary roasting medium.

3. In a roasting apparatus, the combination of an electrical heating unit mounted within a roasting chamber, a baffle above said unit for preventing contact of the material to be roasted with said unit, said baffle being formed of imperforate spaced walls only partially enclosing said unit whereby a portion of the unit is directly exposed from below the baffle, and means for elevating material in the chamber and depositing it on said baffle.

4. In a roasting apparatus, the combination of an electrical heating unit within a roasting chamber, a double wall baffle for preventing contact of the material being roasted with said unit, the walls of said baffle being imperforate, and means for depositing said material on the outer wall of the baffle, for heating the material by conduction, said material also being exposed to heat waves radiating from said unit.

5. In a roasting apparatus, the combination of an electrical heating unit within a roasting chamber, a baffle having inner and outer walls only partially surrounding said unit for preventing material being roasted contacting with said unit, said baffle walls being spaced apart from each other, means for exposing the material in said chamber to heat waves radiating from said unit and for depositing said material on the outer wall of said baffle, to heat said material by conduction, and means for supplying heated air beneath said unit and baffle for heating said material by convection.

6. In a roasting apparatus, the combination of an electrical heating unit mounted within a roasting chamber, a baffle positioned above said unit, means for carrying material to be roasted beneath said unit and for depositing it on said baffle, means for supplying air directly beneath said baffle, and a heat absorbing element positioned adjacent said unit, there being air passages in said element through which the air supplied under the baffle passes.

7. In a roasting apparatus, the combination of an electrical heating unit mounted within a roasting chamber, a baffle positioned above said unit, means for carrying material to be roasted beneath said unit and for depositing it on said baffle, means for supplying air directly beneath said baffle, and a heat absorbing element positioned adjacent said unit, said element having a multiplicity of tortuous passages therein through which air supplied beneath said baffle passes.

8. In a roasting apparatus, the combination of an electrical heating unit mounted within a roasting chamber, a baffle positioned above said unit, means for carrying material to be roasted beneath said unit and for depositing it on said baffle, means for supplying air directly beneath said baffle, and a heat absorbing element positioned adjacent said unit, there being air passages in said element through which the air supplied under the baffle passes, said heating unit and heat absorbing element being removable from the roasting chamber as an entity.

9. In a roasting apparatus, the combination of an electrical heating unit mounted within a roasting chamber, said unit being composed of a pair of spaced resistance members, means for supplying air to said members, means for moving material to be roasted past said elements, and a heat absorbing element positioned between said pair of resistance members, said element having a multiplicity of passages therein through which the air passes.

10. In a roasting apparatus, the combination of an electrical heating unit mounted within a roasting chamber, said unit being composed of a pair of spaced resistance members, means for supplying air to said members, means for moving material to be roasted past said elements, and a heat absorbing element positioned between said pair of resistance members, said element having a multiplicity of passages therein through which the air passes, said resistance members and heat absorbing element being removable from the roasting chamber as an entity through which air supplied to said unit passes.

11. In an electrical heating apparatus, the combination of a compartment for material to be treated, an electrical heating unit, means for supplying air to said unit, and a heat absorbing element positioned adjacent said heating unit and provided with a multiplicity of air passages through which air supplied to said unit passes, said passages communicating with said compartment.

12. In an electrical heating apparatus, the combination of a compartment for material to be treated, an electrical heating unit, means for supplying air to said unit, and a heat absorbing element adjacent said heating unit, said element being substantially co-extensive with said unit and provided with a multiplicity of air passages through which air supplied to said unit passes, said passages communicating with said compartment.

13. In an electrical heating apparatus the combination of an electrical heating unit, means for supplying air to said unit, and a heat absorbing element, adjacent to and receiving heat by radiation from said heating unit, said element being substantially co-extensive with said unit and provided with a multiplicity of air passages so arranged that a given amount of air supplied to said unit will transfer from said heat absorbing element a maximum amount of heat by convection.

14. In a roasting apparatus, the combination of a roasting chamber, a heating unit within said chamber, means for agitating material to be roasted in said chamber, and means for supplying and exhausting air to said chamber, said means comprising an inlet passage extending around said chamber and an outlet passage intermediate said inlet passage and the chamber.

15. In a roasting apparatus, the combination of a roasting chamber, a heating unit within said chamber, means for agitating material to be roasted in said chamber, and means for supplying and exhausting air to said chamber, said means comprising an inlet passage extending around said chamber and an outlet passage intermediate said inlet passage and the chamber, the cross sectional area of said outlet passage being less than that of the inlet passage.

16. In a roasting apparatus, the combination of a roasting chamber, a heating unit within said chamber, means for agitating material to be roasted in said chamber, and means for supplying and exhausting air to said chamber, said means comprising an inlet passage enclosing one end of said chamber and extending around said chamber and an outlet passage extending around the chamber intermediate said chamber and inlet passage.

17. In a roasting apparatus, the combination of a roasting chamber, a heating unit within said chamber, means for agitating material to be roasted in said chamber, and means for supplying and exhausting air to said chamber, said means comprising an inlet passage enclosing one end of said chamber and extending around said chamber and an outlet passage extending around the chamber intermediate said chamber and inlet passage, the cross sectional area of the outlet passage being less than that of the inlet passage.

18. In a roasting apparatus, the combination of a roasting chamber, a heating unit mounted within said roasting chamber, means within said chamber for agitating the material to be roasted, and means for supplying air to and exhausting it from said chamber, comprising a duct enclosing one end wall of the chamber, an exhaust passage extending around the sides of the chamber, and an inlet passage of greater cross sectional area than the exhaust passage extending around said exhaust passage.

ROBERT H. TALBUTT, *Deceased,*
   By *Ralph Robinson, Administrator.*
FREDERICK A. ALLNER.